May 26, 1970  W. B. CLANIN  3,514,086

PIPE CUTTING APPARATUS

Filed Dec. 12, 1966

INVENTOR.
WILLIAM B. CLANIN

BY Wolf, Greenfield & Hieken

ATTORNEYS

United States Patent Office 3,514,086
Patented May 26, 1970

3,514,086
PIPE CUTTING APPARATUS
William B. Clanin, 11833 Mayes Drive,
Whittier, Calif. 90604
Filed Dec. 12, 1966, Ser. No. 601,015
Int. Cl. B23k 7/04
U.S. Cl. 266—23                                  6 Claims

ABSTRACT OF THE DISCLOSURE

The specific pipe cutting tool according to the invention includes a supporting cylindrical casing having front and rear trios of pivotal legs whose radially outwardmost points are adapted to grip the inside of a pipe to be cut. The radially inwardmost points of these legs are pivotally attached to respective front and rear threaded collars which ride on oppositely threaded portions of a rotatable shaft. The rotatable shaft is brought out through a hollow pipe affixed to one end of the cylindrical base and is surrounded by a hollow sleeve for rotatably carrying a cutting torch support. Rotation of the shaft with oppositely threaded portions causes the radially outwardmost points of the front and rear trios of legs to firmly engage the inside surface of a pipe to be cut. The cutting torch is then rotated about the axis of the assembly to cleanly cut the pipe edge, and the assembly may then be removed by rotating the shaft with the oppositely threaded portions to retract the front and rear trios of legs.

BACKGROUND OF THE INVENTION

The present invention relates in general to pipe cutting and more particularly concerns novel apparatus and techniques for rapidly and squarely cutting large diameter metal pipes with equipment that may be brought to large pipes and readily and rapidly used to make a square cut.

SUMMARY OF THE INVENTION

According to the invention, there is a hollow supporting casing comprising leg support means adapted to be situated inside the pipe. This casing carries forward sets and rearward sets of legs pivotally mounted for synchronized radial movement together so that the extremities of each set of legs continuously define respective frontward and rearward circles of the same radius centered about the axis of the casing. The supporting casing also includes means for displacing the legs in synchronism to alter the radius of the forward and rearward circle. The casing also supports a coaxial support means adapted to extend outside the pipe and support pivotally mounted cutting means arranged for rotation about the axis to insure cutting of the pipe in a plane perpendicular to the pipe axis and that of the supporting casing. Preferably the coaxial support means comprises a hollow pipe secured to an end plate in the supporting casing through which a central shaft passes having an end inside the casing with oppositely threaded portions. Forward and rearward collars are inside the casing on respective ones of the threaded portions with the ends of the respective legs inside the casing being pivotally attached to the collar so that as the central shaft with the oppositely threaded portions rotates, the collars are axially displaced to expand and contract the radius of the forward and rearward circles. Preferably the internal portions of the legs are pivotally mounted in slides arranged to slide in grooves formed in the wall of the casing. Preferably the cutting means support comprises a hollow outer tube adapted to be situated on the hollow pipe and carrying a spur gear. Crank means secured to the hollow pipe preferably include a mating spur gear so that rotating the crank causes the cutting means to advance in a perfect circle around the periphery of the pipe to be cut.

It is an important object of this invention to provide methods and means for reliably cutting a wide variety of metal pipes over a wide range of sizes squarely, rapidly and in the field, even though the pipe may be old, and have an externally rough surface.

It is a further object of the invention to achieve the preceding object with a cutting torch support that facilities easy and controlled advance of cutting torch about the periphery of the pipe while making the cut; torch may be either inside or outside the pipe.

It is a further object of the invention to achieve the preceding objects with apparatus that is operable by relatively unskilled personnel.

It is a further object of the invention to achieve the preceding objects with apparatus that is relatively inexpensive, relatively easy to fabricate, and capable of relatively long life.

Numerous other features, objects and advantages of the invention will become apparent from the following specification when read in connection with the accompanying drawing.

DESCRIPTION OF THE PREFERRED EMBODIMENTS

Figure 1:
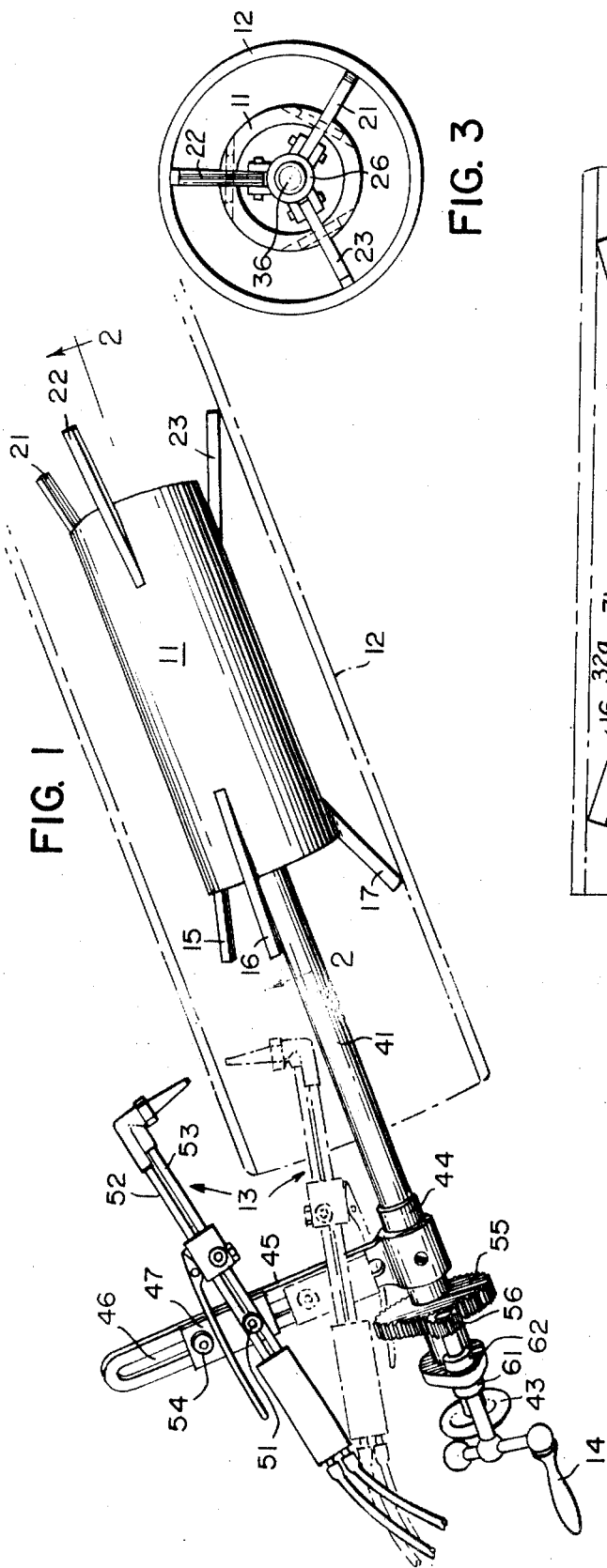
FIG. 1 is a perspective view of a preferred embodiment of the invention situated in a pipe shown in longitudinal section.

With reference now to the drawing and more particularly FIG. 1 thereof, there is shown a perspective view of a preferred embodiment of the invention in which the cylindrical casing 11 is automatically centered in the pipe 12 so that the flame cutting tool 13 may be rotated about the periphery of pipe 12 to rapidly perform a controlled cut as crank 14 is rotated. Supporting cylinder 11 includes a front set of three equiangularly spaced legs 15, 16, and 17 and a similar rear set, 21, 22, and 23. The radially outward tips of these legs, shown seated against the inside surface of pipe 12, define circles of the same diameter, this diameter corresponding substantially to the inside diameter of the pipe when the apparatus is seated and centered as shown.

Figure 2:
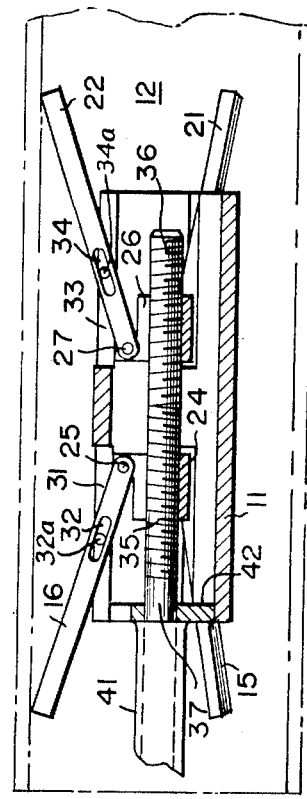
FIG. 2 is a diametrical sectional view through a portion of the structure shown in the pipe in FIG. 1 helpful in understanding the internal mechanism.

As best seen in FIG. 2, a view through section 2—2 of FIG. 1, each of the forward legs is pivotally attached at its inward end to a forward threaded collar 24, such as at 25. Similarly, each of the rearward set of legs 21, 22, and 23 is pivotally attached at its radially inwardmost point to a rear threaded collar 26, such as at 27. Each of the forward legs is slidable in a slot, such as 31 in the wall of the supporting casing 11, and is guided by a stationary guide pin 32a received in leg slot 32. Similarly, each of the rearward legs 21, 22 and 23 is translatable in a slot, such as 33, in the outer wall of supporting casing 11, and is guided by a stationary guide pin 34a received in leg slot 34.

Forward collar 25 and rearward collar 26 ride on oppositely threaded portions 35 and 36, respectively attached to the end of rotatable central shaft 37. Rotatable shaft 37 rotates in hollow supporting end shaft 41 that is secured to end plate 42 of supporting casing 11 having a central opening through which shaft 37 protrudes.

Referring again to FIG. 1, the outside end of shaft 37 has a hand wheel 43 attached so that an operator may grasp hollow shaft 41 with one hand, position the assembly axially until cutting means 13 is located at the desired position, and rotate hand wheel 43 to cause forward collar 24 and rearward collar 26 to move apart, whereby the outermost ends of the forward and rearward legs firmly contact the inside surface of pipe 12 to both center and firmly support the assembly.

The cutting torch support assembly includes a length of hollow pipe 44 supported on and rotatable about hollow pipe 41 and a flat bar 45. Flat bar 45 is formed with a lengthwise groove 46 in which a cutting torch support plate 47 may ride and be secured at a fixed radial distance from the axis of the assembly. The cutting torch 13 may then be secured to support plate 47 by means including the nut and bolt assembly 51 passing through the gas tubes 52 and 53 of the torch. Screw and nut assembly 54 lock base plate 47 at a fixed radial distance with the position of cutting torch 13 adjusted at the correct point relative to the pipe to effect cutting along the desired circumferential line. Note that the cutting torch may be positioned inside the pipe as indicated by the dashed-dotted outline, or, alternately, torches may be operated simultaneously from inside and outside to effect rapid cutting of a relatively thick pipe. Alternately, cutting tools in physical engagement with the pipe may be employed within the principles of the invention. The cutting torch may be any well-known oxyacetyline cutting torch, or, may be a special one.

Base pipe 44 preferably supports a large spur gear 55 adapted to mesh with a smaller driving spur gear 56 that is affixed to the end of rod 57. Crank rod 57 is rotatably supported in a bearing 61 carried by a bearing support plate 62 that is secured to hollow shaft 41. Crank 14 or its substitute, a flexible cable, is affixed to the end of crank rod 57 so that rotation of crank 14 rotates driving spur gear 56 and in turn spur gear 55 to cause the cutting torch 13 to rotate around the pipe to effect cutting around the circumference at a rate determined by the operator.

Figure 3:
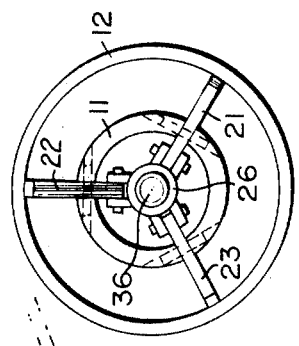
FIG. 3 is an end view of a pipe with the invention helpful in understanding how the ends of the legs firmly grip the inside surface of the pipe.

Referring to FIG. 3, there is a rear end view of the assembly in the pipe showing how the legs firmly grip the internal surface of the pipe being cut to effect centering.

Briefly reviewing operation, an operator inserts the casing 11 inside the end of a pipe to be cut with the legs collapsed so that their radially outwardmost points define a circle that is less than the inside diameter of the pipe to be cut. The assembly is positioned axially so that the cut occurs at the desired point. Hand wheel 43 is rotated clockwise to cause forward collar 25 and rearward collar 26 to move apart and extend the extremities of the legs radially outward until they firmly grip the inside of the pipe to be cut. Since the pipe is gripped at points instead of along a surface or line, the chance of internal accumulation on the pipe inside surface preventing centering is very remote. And since the point moving radially outward can apply a great deal of radial pressure outward, the leg points tend to penetrate internal mineral and other deposits and firmly engage the firm inside surface of the pipe to provide nearly exact centering. The cutting torch is then ignited, and crank 14 is rotated until the pipe is cut through. Hand wheel 43 is then rotated clockwise to draw the extremities of the legs radially inward, and the assembly removed.

Although more or fewer legs may be employed within the scope of the invention, the two sets of three equiangularly spaced legs is preferred to insure stable centering. The radially outward extremities of all the legs should be equidistant from the axis at all radial distances corresponding to the range of inside radii of pipe for which it is desired to use the invention to cut.

The invention affords a number of advantages. The wide axial spacing of the extremities of the forward and rearward legs insures a stable support platform for the rotating cutting assembly. Yet, the assembly is light and may be rapidly and easily installed and operated by relatively unskilled personnel at the site of the pipe.

It is evident that those skilled in the art may now make numerous modifications and uses of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Pipe cutting apparatus comprising, first and second axially displaced sets of legs with each of said legs being a unitary structure, means to slidably support said first and second sets of legs so that the radially outward extremities of each set of legs continuously define respective first and second circles of the same radius displaced axially along a common axis, means for pivotally supporting and displacing said legs in synchronism to alter the radius of said first and second circles, cutting support means, means for attaching said cutting support means to said leg support means with said cutting support means embracing said axis in axial displaced relationship to said leg support means, and cutting means supported by said cutting support means rotatable about said axis for cutting pipe when said radially outward extremities grip the inside surface of pipe to be cut, said first and second sets each comprising at least three of said legs, said leg support means comprising a hollow cylindrical casing to which each of said legs is slidably attached about a stationary guide pin in a slot intermediate the radially outward extremity and radially inward extremity of the leg, said means for pivotally supporting and displacing said legs in synchronism comprising means inside said hollow cylindrical casing pivotally attached to the radially inward extremity of each of said legs for axially translating said radially inward extremities.

2. Pipe cutting apparatus in accordance with claim 1 wherein said means for pivotally supporting and displacing said legs comprises first and and second collars displaced axially along said axis inside said hollow cylindrical casing and means for displacing said collars along said axis.

3. Pipe cutting apparatus in accordance with claim 2 wherein said first and second collars are oppositely threaded and said means for displacing comprises a shaft along said axis having first and second oppositely threaded portions inside said cylindrical casing for threadably engaging said first and second collars respectively whereby rotation of said shaft in first and second opposite rotational senses relatively displaces said collars closer together and farther apart respectively.

4. Pipe cutting apparatus in accordance with claim 3 wherein said means for attaching said cutting support means comprises, a hollow pipe attached and in fixed relation to said cylindrical casing and embracing said shaft, and said cutting support means comprises a sleeve rotatably supported upon said hollow pipe and having radially extending arm means for carrying said cutting means whereby rotation of said sleeve about said axis causes said cutting means to trace a circular path about said axis.

5. Pipe cutting apparatus in accordance with claim 4 and further comprising, drive means supported on said hollow pipe for rotating said sleeve about said axis.

6. Pipe cutting apparatus in accordance with claim 5 wherein said drive means comprises a driven gear attached to said sleeve, a driving gear engaging said driven gear and attached to a driving shaft for introducing a mechanical advantage whereby a revolution of said driven gear occurs in response to a plurality of revolutions of said driving shaft, and said driving shaft.

References Cited

UNITED STATES PATENTS

| | | | |
|---|---|---|---|
| 938,058 | 10/1909 | Johnston | 82—4.3 X |
| 1,231,743 | 7/1917 | Johnston | 82—4.3 X |
| 1,823,959 | 9/1931 | Steinmayer | 82—4.3 |
| 2,054,925 | 9/1936 | Bucknam et al. | 266—23 |
| 2,501,893 | 3/1950 | Dudley | 266—23 |
| 2,878,010 | 3/1959 | Cink | 266—23 |
| 3,171,309 | 3/1965 | Cloutier | 82—4.3 |
| 3,196,722 | 7/1965 | Lewis et al. | 83—187 X |

FOREIGN PATENTS 311,318  1/1956  Switzerland.

ROBERT D. BALDWIN, Primary Examiner

U.S. Cl. X.R.

33—21